(12) United States Patent
Fujita et al.

(10) Patent No.: US 9,531,103 B2
(45) Date of Patent: Dec. 27, 2016

(54) CHARGING CONNECTOR

(71) Applicant: Yazaki Corporation, Tokyo (JP)

(72) Inventors: Tomomi Fujita, Shizuoka (JP); Seiji Kozono, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/071,391

(22) Filed: Mar. 16, 2016

(65) Prior Publication Data

US 2016/0197430 A1  Jul. 7, 2016

Related U.S. Application Data

(63) Continuation of application No. PCT/JP2014/077925, filed on Oct. 21, 2014.

(30) Foreign Application Priority Data

Oct. 21, 2013 (JP) .................................. 2013-218005

(51) Int. Cl.
*B60R 27/00* (2006.01)
*H01R 13/42* (2006.01)
(Continued)

(52) U.S. Cl.
CPC ................. *H01R 13/42* (2013.01); *B60L 3/00* (2013.01); *B60L 11/1818* (2013.01); *H01R 13/44* (2013.01); *H01R 13/502* (2013.01); *H01R 13/516* (2013.01); *B60L 2230/12* (2013.01); *H01R 2201/26* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ..................... H01R 2201/26; H01R 13/62933; H01R 13/7032; H01R 2103/00; H01R 13/629; H01R 23/7068; B60R 16/0207; B60R 27/00
USPC ..................... 439/34, 310, 188, 924.1; 320/2
See application file for complete search history.

(56) References Cited

U.S. PATENT DOCUMENTS 5,458,496 A   10/1995   Itou et al.
5,556,284 A    9/1996   Itou et al.
(Continued)

FOREIGN PATENT DOCUMENTS

JP   06-333633 A   12/1994
JP   07-67210 A    3/1995
(Continued)

OTHER PUBLICATIONS

International Search Report of PCT/JP2014/077925 dated Jan. 20, 2015.

*Primary Examiner* — Gary Paumen
(74) *Attorney, Agent, or Firm* — Sughrue Mion, PLLC

(57) ABSTRACT

A charging connector includes: a source-side terminal connected to a source side; an inner housing for receiving the source-side terminal; an intermediate terminal having a power source connection electrically connectable to and electrically disconnectable from the source-side terminal and an inlet connection electrically connectable to and electrically disconnectable from an inlet-side terminal connected to a side of a vehicle inlet; and a cassette housing that receives the intermediate terminal, is assembled to the inner housing, and is mateable with the vehicle inlet.

4 Claims, 18 Drawing Sheets

(51) Int. Cl.
*H01R 13/516* (2006.01)
*B60L 11/18* (2006.01)
*H01R 13/44* (2006.01)
*B60L 3/00* (2006.01)
*H01R 13/502* (2006.01)

(56) References Cited

U.S. PATENT DOCUMENTS

| | | | |
|---|---|---|---|
| 5,577,920 A | | 11/1996 | Itou et al. |
| 5,637,977 A | | 6/1997 | Saito et al. |
| 5,816,643 A | | 10/1998 | Itou et al. |
| 6,123,569 A | * | 9/2000 | Fukushima ......... B60L 11/1818 439/310 |
| 6,371,768 B1 | * | 4/2002 | Neblett ............... B60L 11/1818 439/34 |
| 7,202,576 B1 | * | 4/2007 | Dechene ................ H02J 9/06 307/66 |
| 2014/0106586 A1 | * | 4/2014 | Boeck ................... H01R 13/52 439/188 |

FOREIGN PATENT DOCUMENTS

| | | |
|---|---|---|
| JP | 2012-105513 A | 5/2012 |
| JP | 2013-157160 A | 8/2013 |

\* cited by examiner

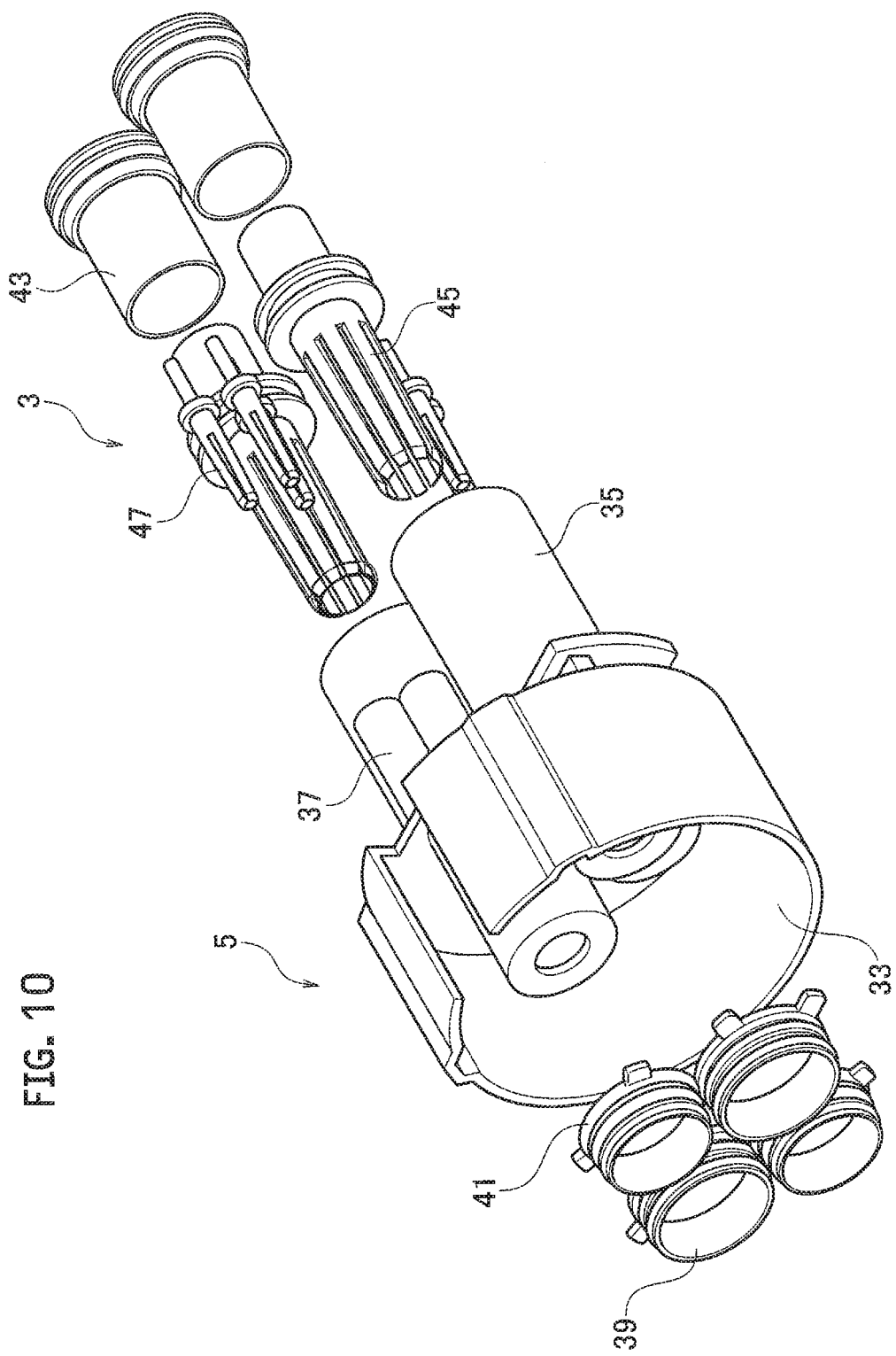

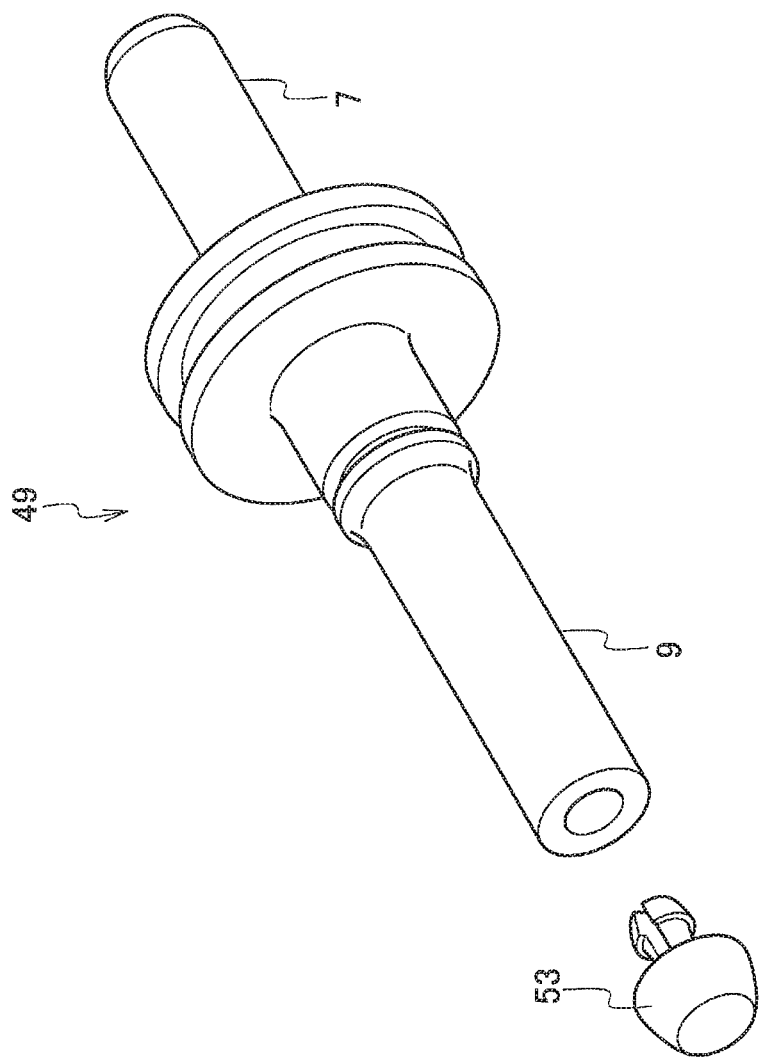

CHARGING CONNECTOR

CROSS REFERENCE TO RELATED APPLICATION

This application is a Continuation of PCT Application No. PCT/JP2014/077925, filed on Oct. 21, 2014, and claims the priority of Japanese Patent Application No. 2013-218005, filed on Oct. 21, 2013, the content of both of which is incorporated herein by reference.

BACKGROUND

Technical Field

The disclosure relates to a charging connector.

Related Art

Japanese Unexamined Patent Application Publication No. 6-333633 proposes a charging connector which is arranged on the source side and mates with a vehicle inlet installed to charge a battery mounted, for example, on an electric vehicle, and through which power is supplied from the power source.

This charging connector includes a cylindrical case, a terminal having an inlet connection that is provided at the end of a wire connected to the source side and can be connected to and disconnected from an inlet-side terminal connected to a side of the vehicle inlet, and a housing that receives the terminal, is fitted in the case, and is mateable with the vehicle inlet.

SUMMARY

In the charging connector disclosed in Japanese Unexamined Patent Application Publication No. 6-333633, however, the inlet connection of the terminal connected to and disconnected from the inlet-side terminal reaches end-of-life due to about ten thousand connections/disconnections and replacement of the terminal is needed.

The charging connector disclosed in Japanese Unexamined Patent Application Publication No. 6-333633 requires the process of removing the terminal from the wire and attaching a new terminal to the wire again in order to replace the terminal, which deteriorates workability in assembling.

An object of the disclosure is to provide a charging connector with improved assembling workability.

A charging connector in accordance with some embodiments includes: a source-side terminal connected to a source side; an inner housing for receiving the source-side terminal; an intermediate terminal having a power source connection electrically connectable to and electrically disconnectable from the source-side terminal and an inlet connection electrically connectable to and electrically disconnectable from an inlet-side terminal connected to a side of a vehicle inlet; and a cassette housing for receiving the intermediate terminal, the cassette housing being assembled to the inner housing and mateable with the vehicle inlet.

According to the above structure, the cassette housing is provided that receives the intermediate terminal having the power source connection capable of being electrically connected to and disconnected from the source-side terminal and the inlet connection capable of being electrically connected to and disconnected from the inlet-side terminal. Accordingly, when the intermediate terminal is replaced due to end-of-life of the inlet connection, the cassette housing can be removed from the inner housing and a new intermediate terminal can be received in the cassette housing.

Thus, the above structure does not require the process of removing the terminal from the wire and attaching a new terminal to the wire again, thereby greatly improving assembling workability.

The charging connector may further include an outer housing assembled to an outer periphery of the cassette housing on the side of the vehicle inlet and configured to protect the cassette housing.

According to the above structure, the outer housing for protecting the cassette housing is assembled to the outer periphery of the cassette housing on the side of the vehicle inlet. This prevents the cassette housing from being damaged, for example, by dropping and improves the durability of the cassette housing.

The intermediate terminal and the source-side terminal may include: a pair of source terminals electrically connectable to and electrically disconnectable from each other; and a pair of signal terminals electrically connectable to and electrically disconnectable from each other, and a length for connection and disconnection of the pair of source terminals may be longer than a length for connection and disconnection of the pair of signal terminals.

According to the above structure, the connection or disconnection length of the pair of source terminals is set to be longer than that of the pair of signal terminals. Thus, if the cassette housing should drop off the inner housing, the pair of signal terminals is disengaged before the pair of source terminals and power is deactivated, thereby preventing the occurrence of an arc.

BRIEF DESCRIPTION OF DRAWINGS

FIG. 10 is a perspective view of a source-side terminal and the inner housing of the charging connector according to the embodiment of the present invention.

FIG. 12 is a perspective view of the intermediate source terminal of the charging connector according to the embodiment of the present invention.

DETAILED DESCRIPTION

Figure 1:
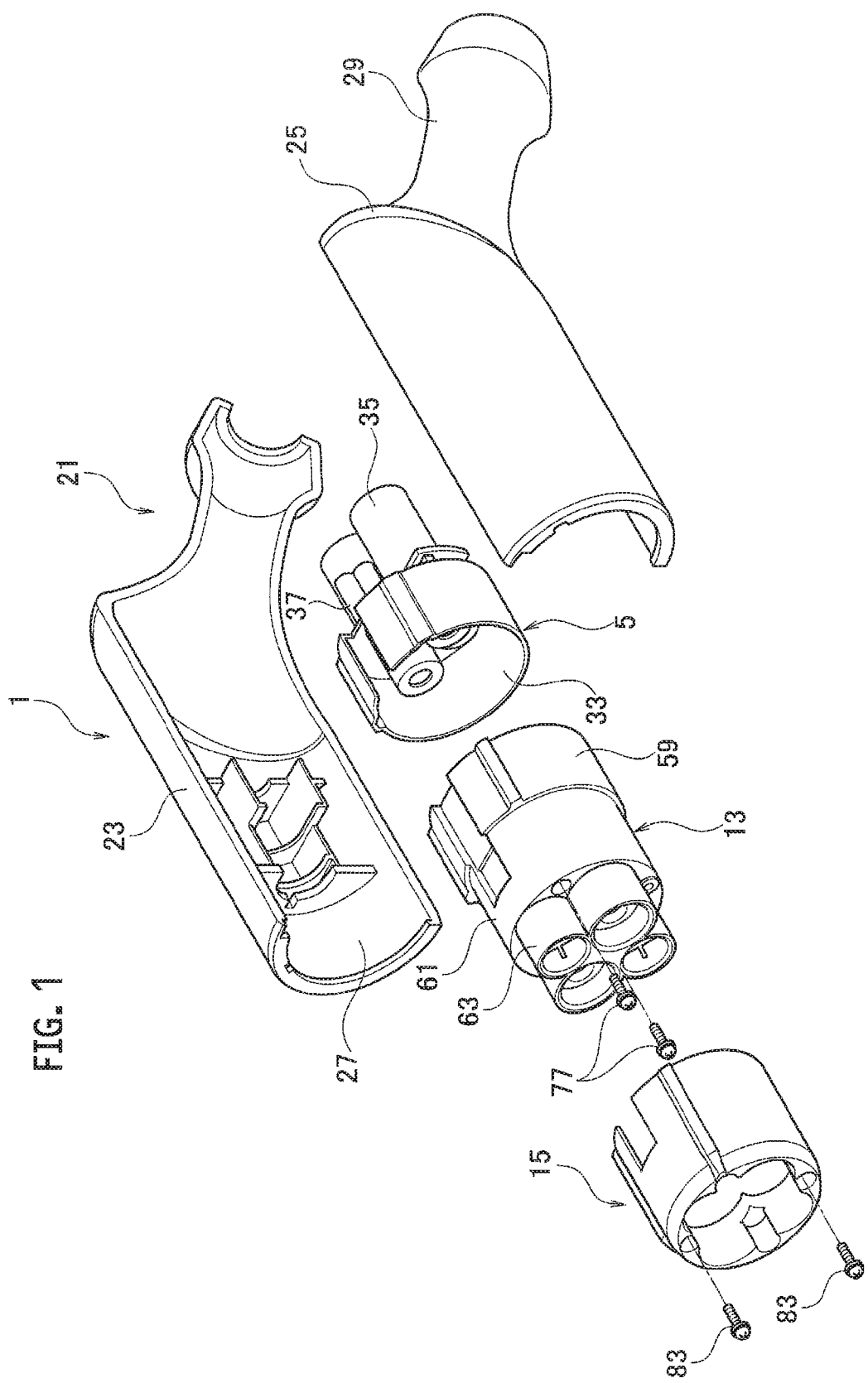
FIG. 1 is an exploded perspective view of a charging connector according to an embodiment of the present invention.
Figure 2:
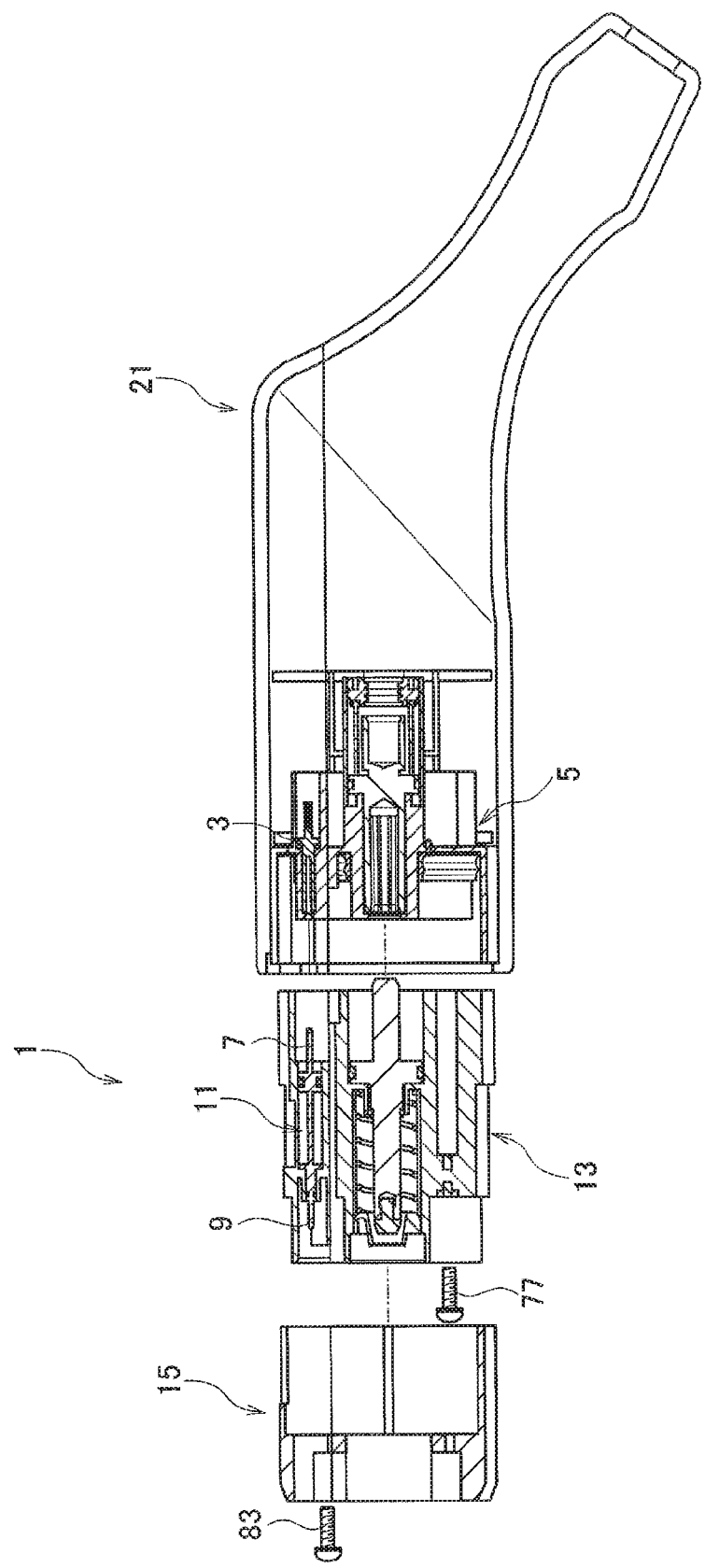
FIG. 2 is an exploded sectional view of the charging connector according to the embodiment of the present invention.
Figure 3:
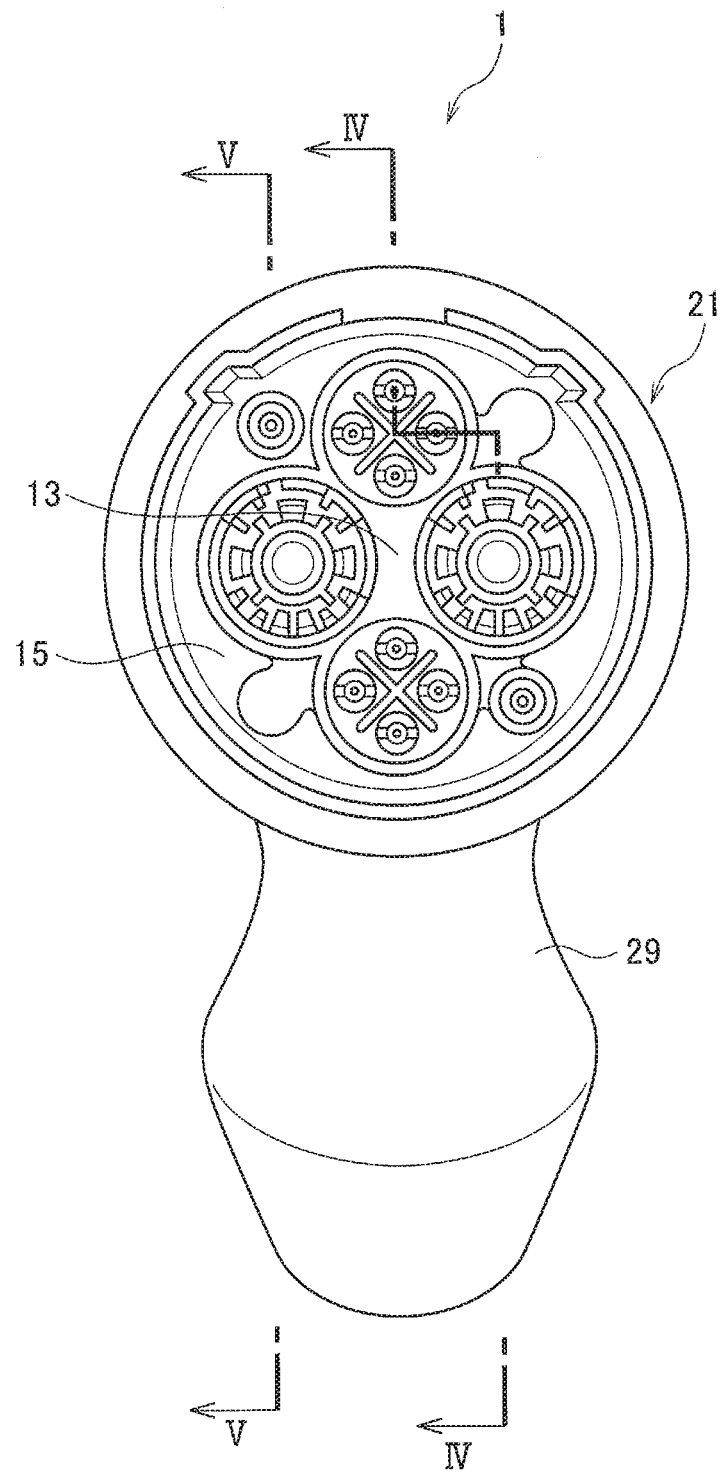
FIG. 3 is a front view of the charging connector according to the embodiment of the present invention.
Figure 4:
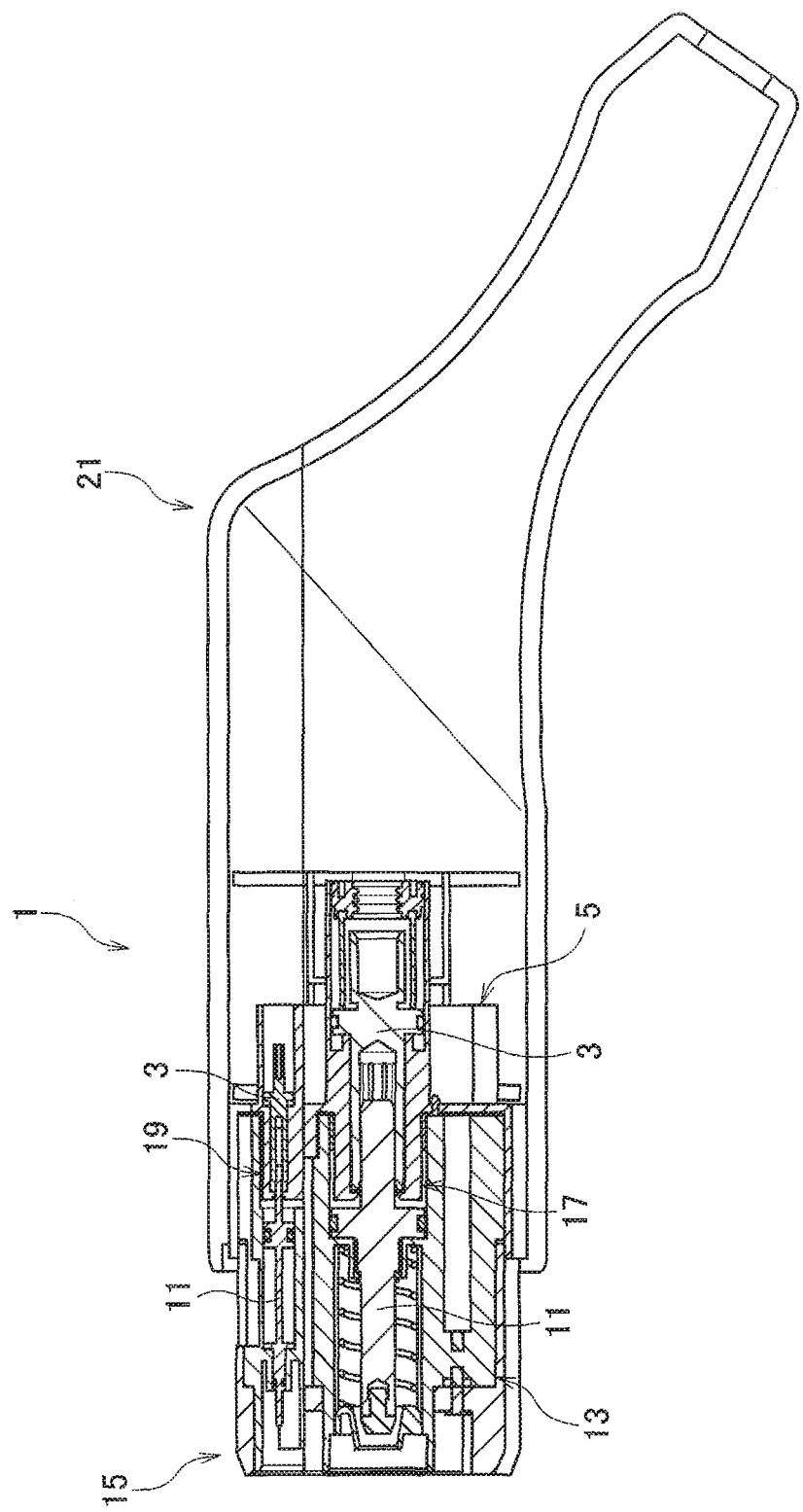
FIG. 4 is a cross-sectional view taken along line IV-IV of FIG. 3.
Figure 5:
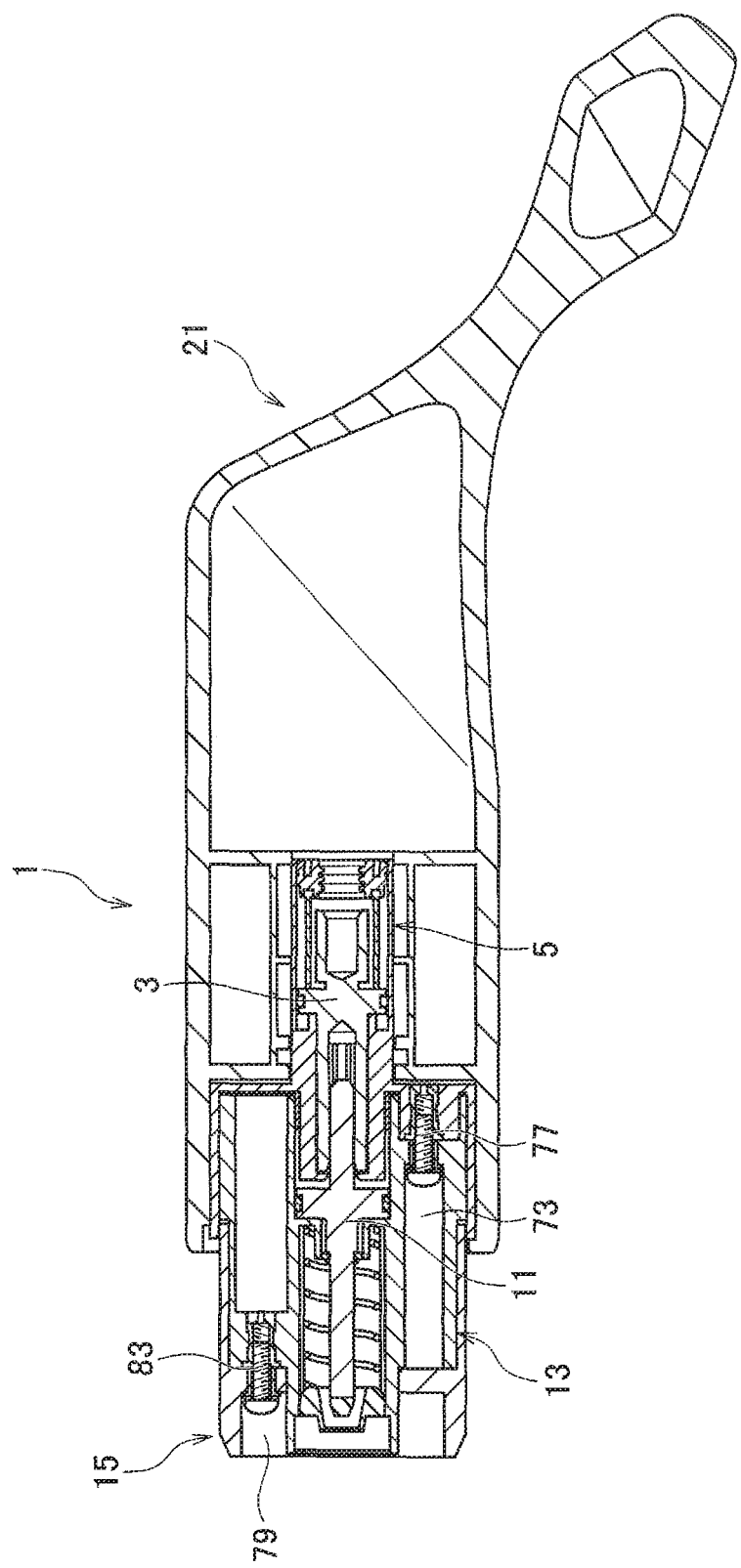
FIG. 5 is a cross-sectional view taken along line V-V of FIG. 3.
Figure 6:
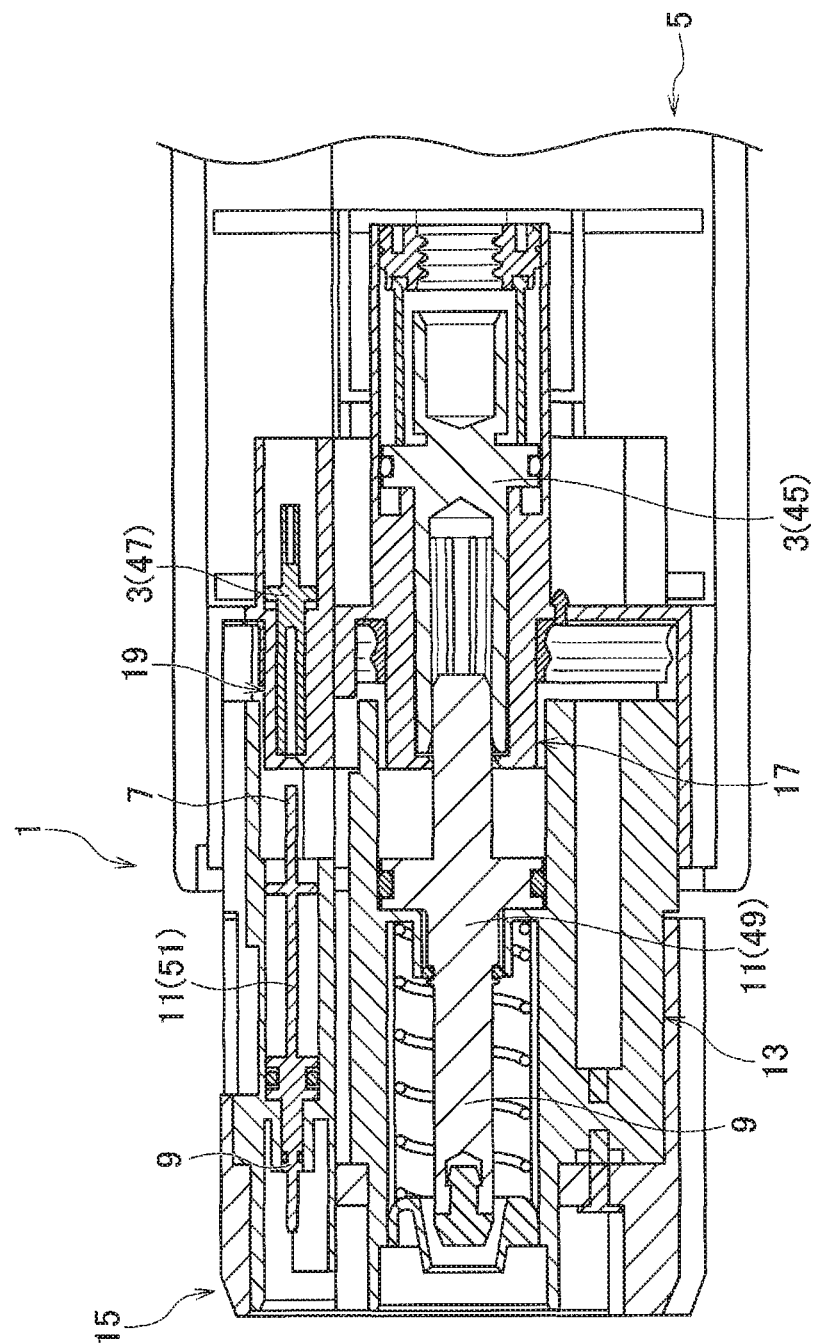
FIG. 6 is a sectional view of the charging connector according to the embodiment of the present invention.
Figure 7A:
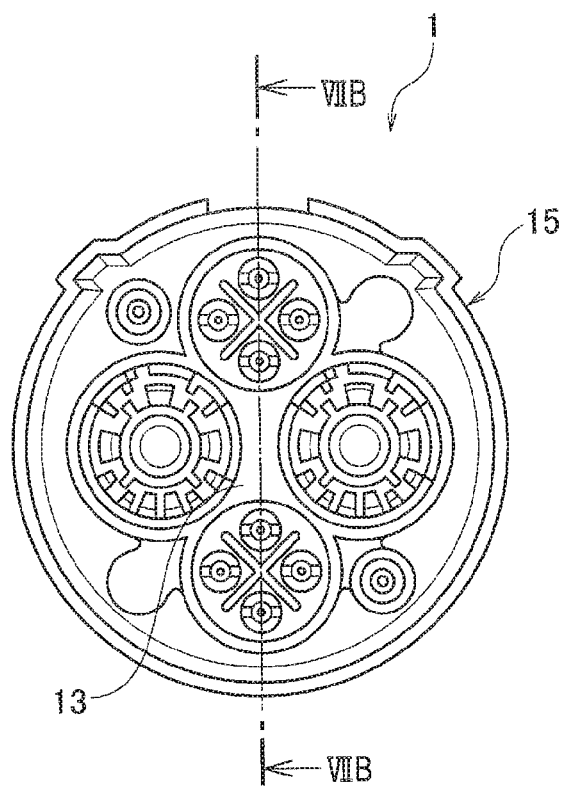
FIG. 7A is a front view of the charging connector according to the embodiment of the present invention.
Figure 7B:
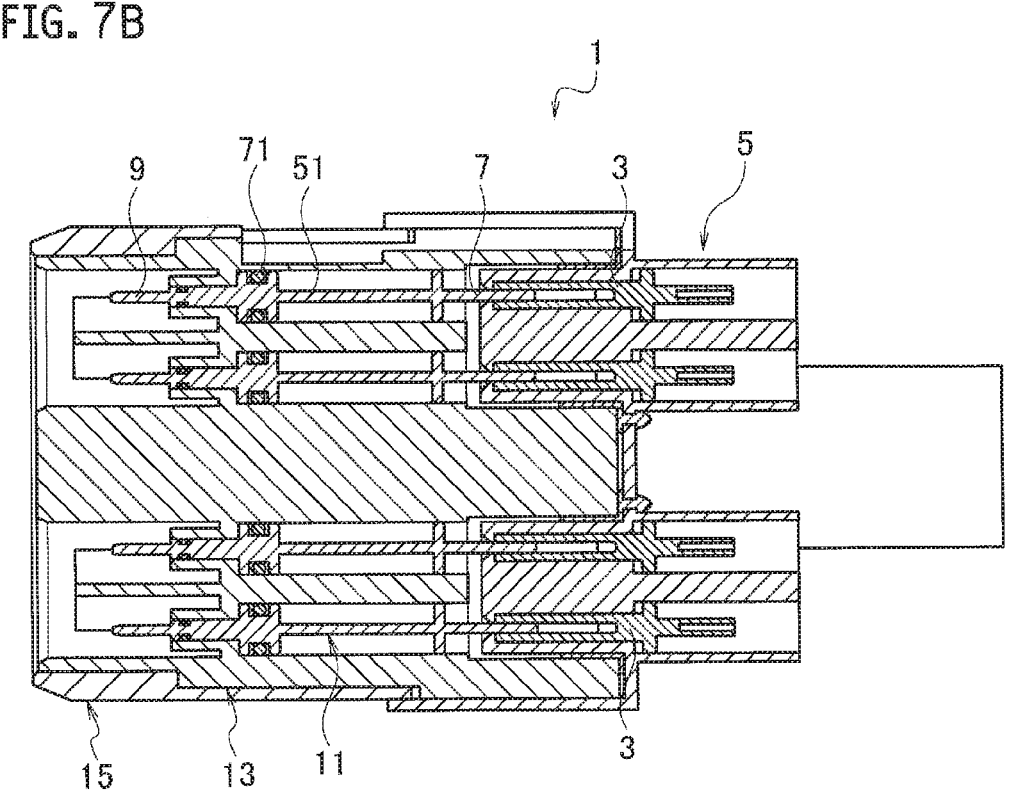
FIG. 7B is a sectional view taken along line VIIB-VIIB of FIG. 7A.
Figure 8:
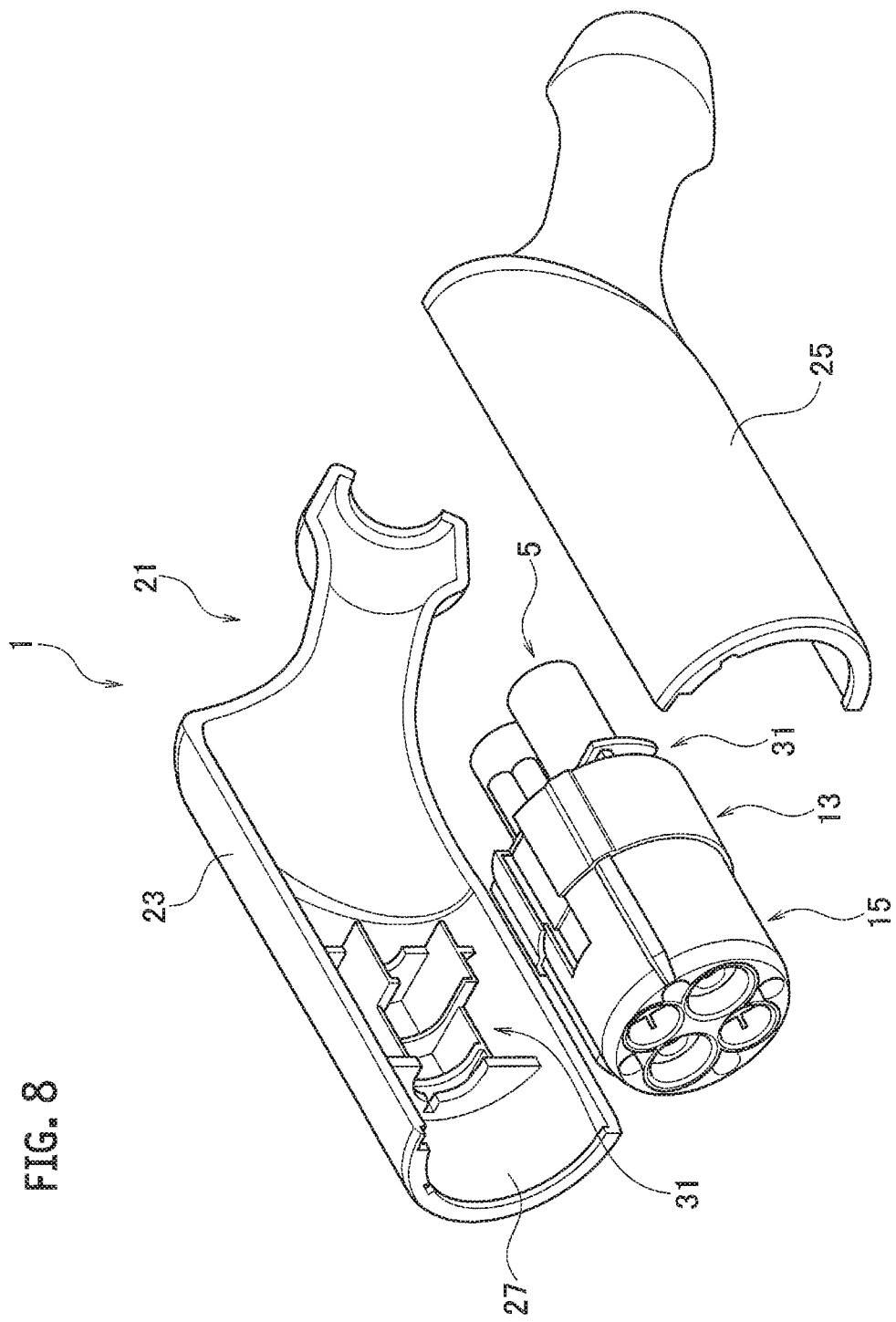
FIG. 8 is a perspective view of a case of the charging connector according to the embodiment of the present invention when the case is assembled.
Figure 9A:
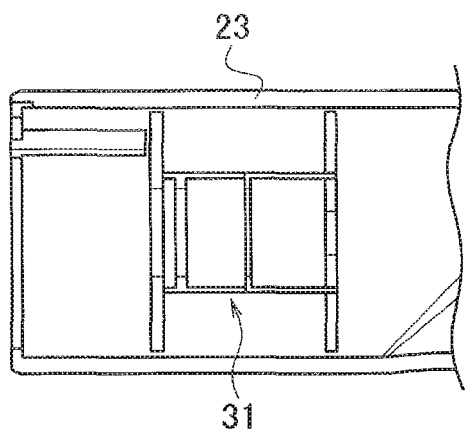
FIG. 9A is a side view of one separate member of the case of the charging connector according to the embodiment of the present invention.
Figure 9B:
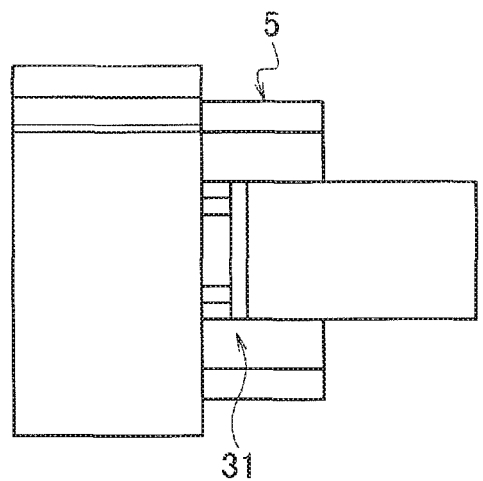
FIG. 9B is a side view of an inner housing of the charging connector according to the embodiment of the present invention.
Figure 9C:
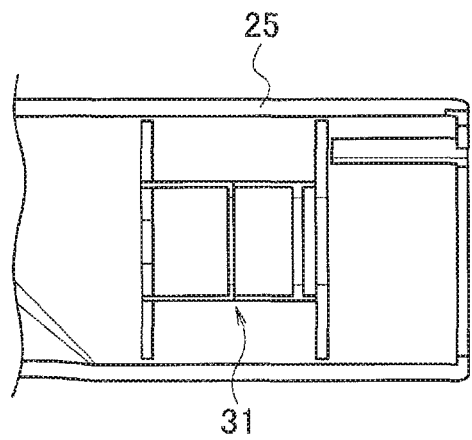
FIG. 9C is a side view of the other separate member of the case of the charging connector according to the embodiment of the present invention.
Figure 11:
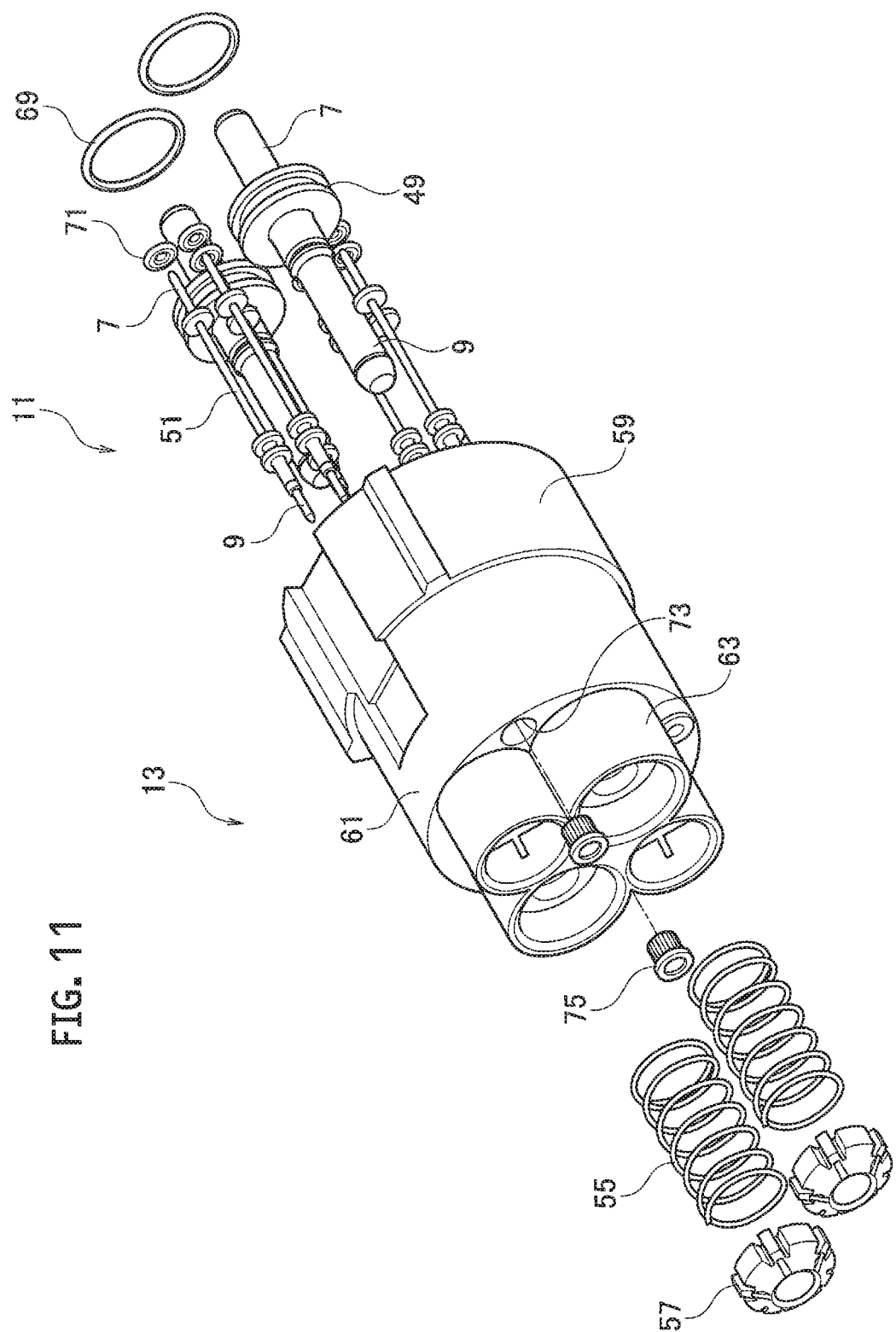
FIG. 11 is a perspective view of an intermediate terminal and a cassette housing of the charging connector according to the embodiment of the present invention.
Figure 13A:
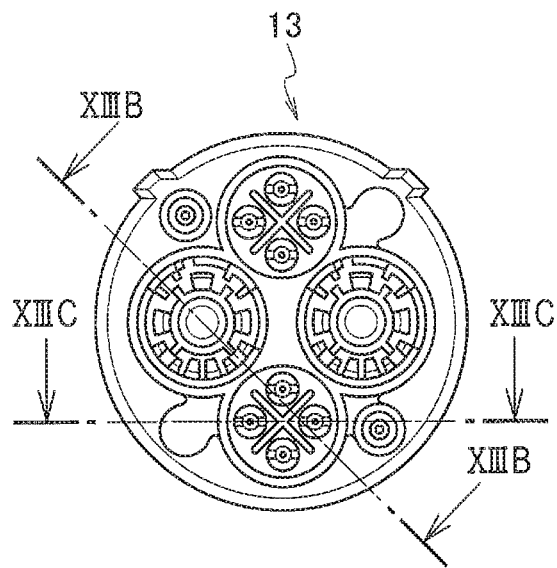
FIG. 13A is a front view of the cassette housing of the charging connector according to the embodiment of the present invention.
Figure 13B:
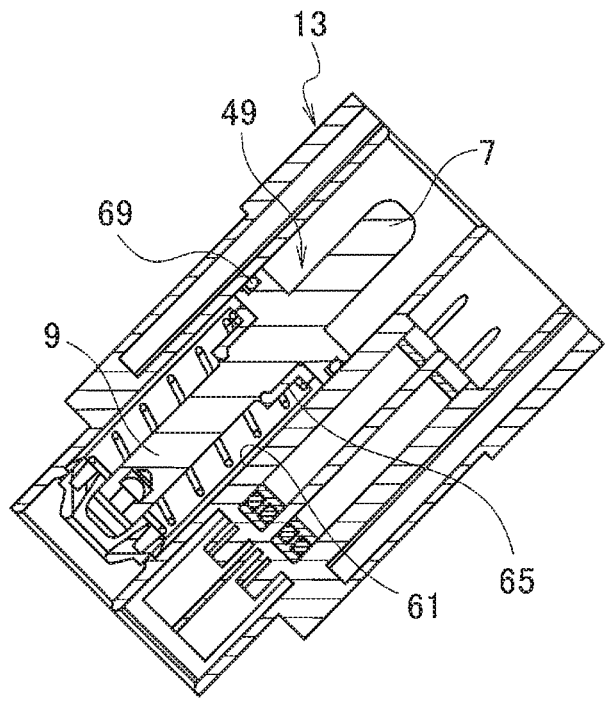
FIG. 13B is a sectional view taken along line XIIIB-XIIIB of FIG. 13A.
Figure 13C:
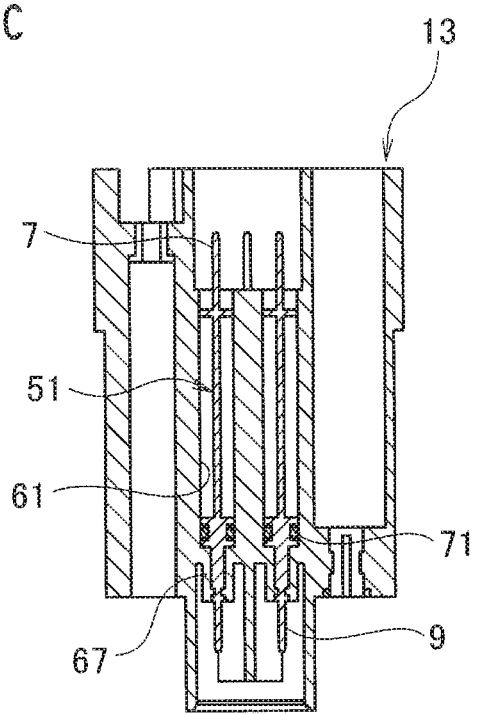
FIG. 13C is a sectional view taken along line XIIIC-XIIIC of FIG. 13A.
Figure 14:
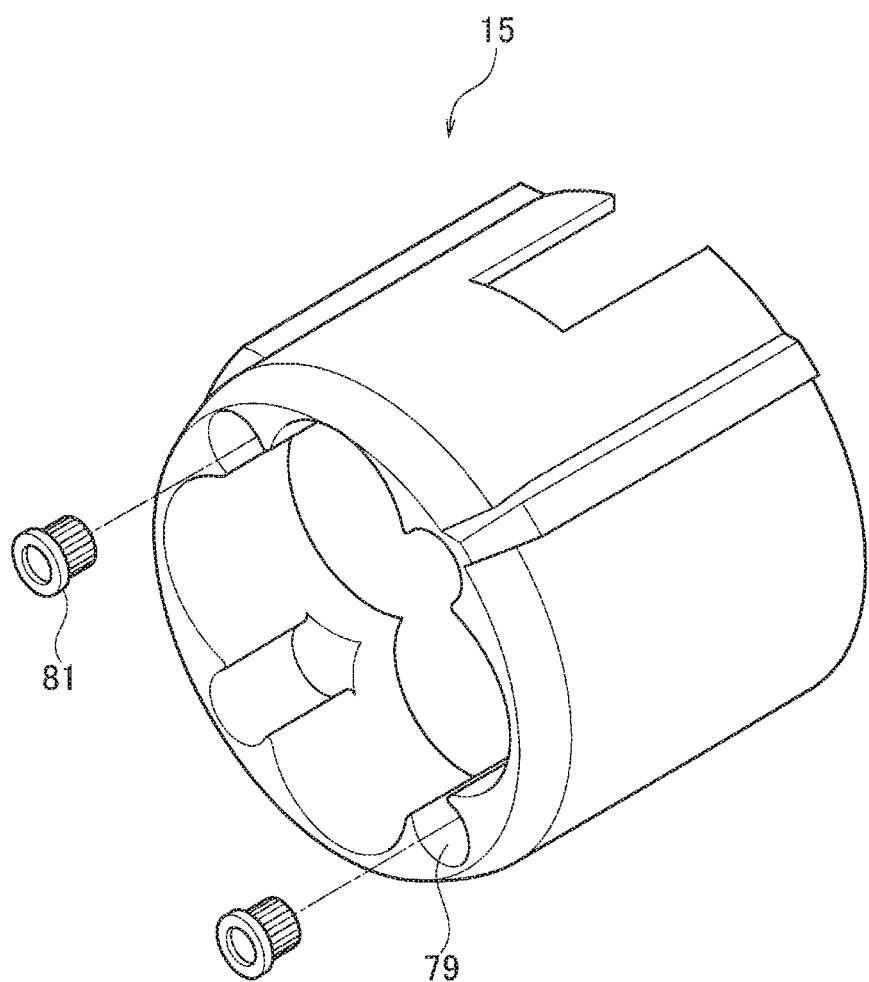
FIG. 14 is a perspective view of an outer housing of the charging connector according to the embodiment of the present invention.

A charging connector 1 according to the embodiment of the present invention is described with reference to FIGS. 1 through 17.

A charging connector 1 is arranged on the source (not shown) side, mates with a vehicle inlet 85 installed to charge a vehicle power supply, such as a battery mounted, for example, on an electric vehicle, and can supply power from a power source.

The charging connector 1 includes a source-side terminal 3 connected to the source side; an inner housing 5 for receiving the source-side terminal 3; an intermediate terminal 11 having a power source connection 7 capable of being electrically connected to and disconnected from the source-side terminal 3 and an inlet connection 9 capable of being electrically connected to and disconnected from an inlet-side terminal 93 connected to a side of the vehicle inlet 85; and a cassette housing 13 that receives the intermediate terminal 11, is assembled to the inner housing 5, and is mateable with the vehicle inlet 85.

An outer housing 15 for protecting the cassette housing 13 is assembled to the cassette housing 13 at its outer periphery of the side of the vehicle inlet 85.

The intermediate terminal 11 and the source-side terminal 3 include a pair of source terminals 17 that can be removably inserted into each other and electrically connected to and disconnected from each other and a pair of signal terminals 19 that can be removably inserted into each other and electrically connected to and disconnected from each other. An insertion or removal length of the pair of source terminals 17 is set to be longer than that of the pair of signal terminals 19.

Figure 16:
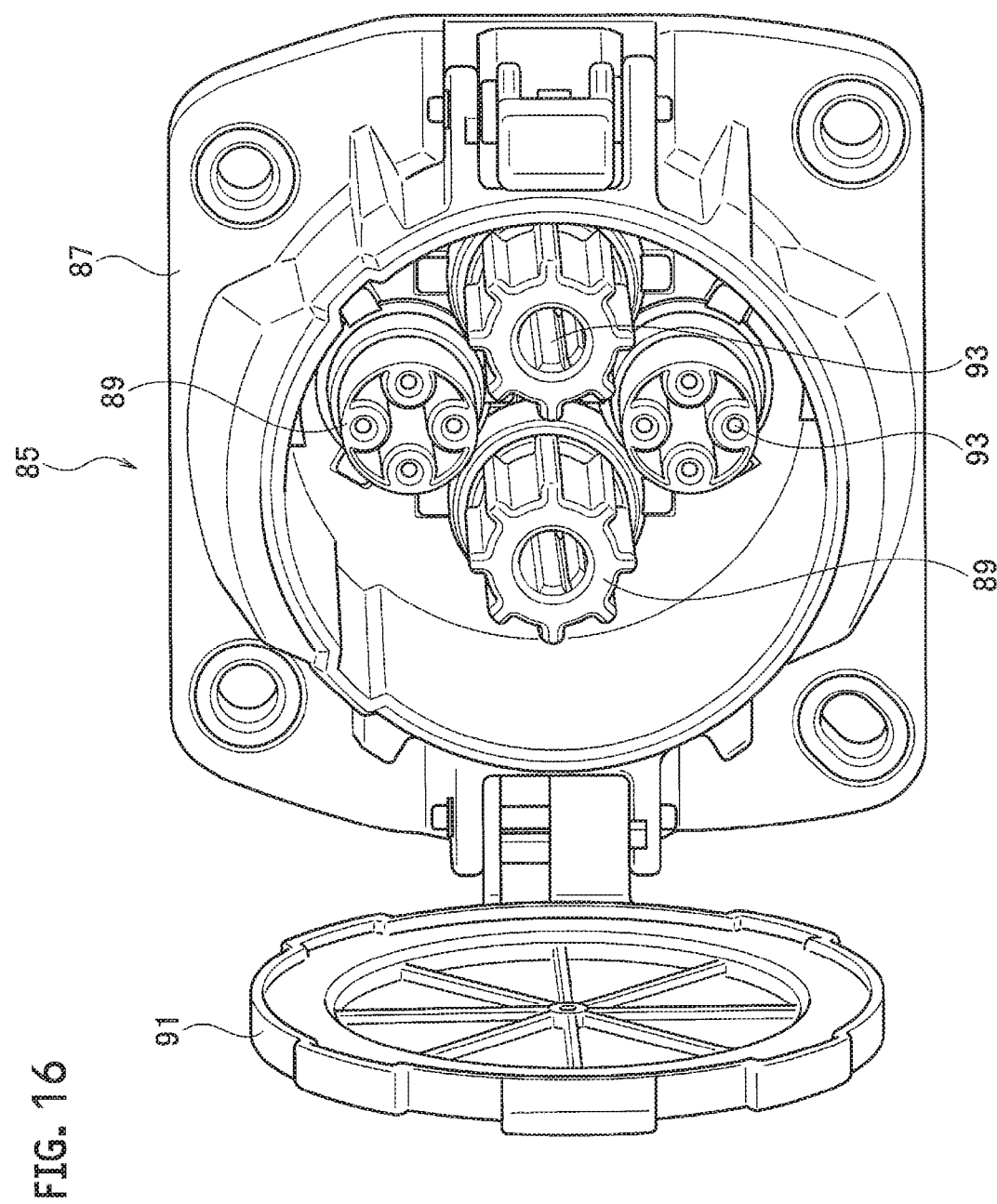
FIG. 16 is a perspective view of a vehicle inlet to which the charging connector according to the embodiment of the present invention is connected.
Figure 17:
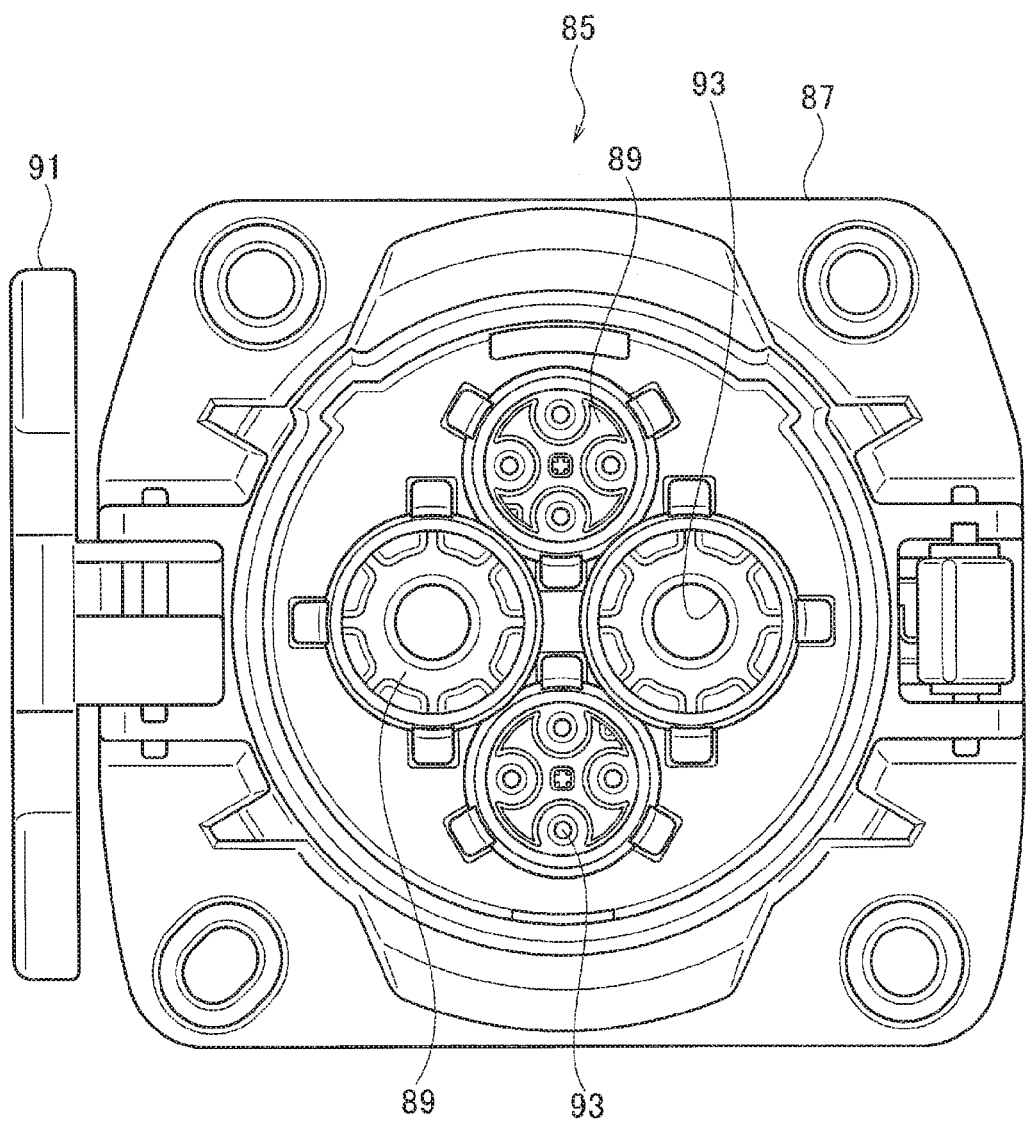
FIG. 17 is a front view of the vehicle inlet to which the charging connector according to the embodiment of the present invention is connected.

As illustrated in FIGS. 16 and 17, a vehicle, such as an electric vehicle, is provided with the vehicle inlet 85, which is connected to the vehicle power supply, such as a battery or a storage battery, mounted on the vehicle. The vehicle inlet 85 is provided in a body 87 with a plurality, herein four, of connected connections 89 to which the charging connector 1 is connected, and each of the connected connections 89 has the inlet-side terminal 93 therein.

The body 87 has an openable cover 91 connected thereto for covering the connected connections 89. The vehicle power supply is charged by connecting the charging connector 1 to such a vehicle inlet 85.

As illustrated in FIGS. 1 through 15B, the charging connector 1 includes a case 21, the inner housing 5, the cassette housing 13, and the outer housing 15.

The case 21 is configured with two separate members 23, 25 that are symmetrically divided. The case 21 has a receiving portion 27 on one end thereof that is formed in a cylindrical shape and receives the inner housing 5 and the cassette housing 13 and a grip 29 on the other end thereof that is formed by bending a single member continuous from the receiving portion 27 and allows for gripping.

The case 21 receives the inner housing 5 in the receiving portion 27, and a wire (not shown) connected to the source-side terminal 3 received in the inner housing 5 is drawn from the end of the grip 29. The assembly of the separate members 23, 25 is maintained, for example, by securing means, such as bolts or adhesive, or by engagement means for engaging with each other.

The case 21 receives the inner housing 5 therein by assembling the separate members 23, 25 with the outer periphery of the inner housing 5 held by the separate members 23, 25. The inner peripheries of the separate members 23, 25 and the outer periphery of the inner housing 5 are provided with respective fixing portions 31, and the inner housing 5 is retained in the case 21 by engagement of the fixing portions 31. The fixing portions 31, 31 of the separate members 23, 25 are arranged in line symmetry, thereby preventing the inner housing 5 from being incorrectly received in the case 21.

The inner housing 5 is formed in a cylindrical shape. One end of the inner housing 5 is provided with a mating portion 33 with which the cassette housing 13 is mateable, and the other end of the inner housing 5 is provided with exit portions 35, 37 through which wires to be connected to the source-side terminal 3 received inside can be drawn.

The mating portion 33 has a plurality of sealing members 39, 41 arranged therein that seal between the cassette housing 13 and the inner housing 5. The exit portion 35 has a sealing member 43 arranged therein that seals between the wire connected to the source-side terminal 3 and the inner housing 5. The inner housing 5 has a plurality of source-side terminals 3 therein.

The source-side terminal 3 includes a plurality, herein two, of source terminals 45 each connected to a wire which is connected to a power source and through which power is supplied and a plurality, herein eight, of signal terminals 47 each connected to a wire which is connected to a source-side device and through which a signal is transmitted.

One end of each of the source-side terminals 3 is provided with a female terminal that is formed in a cylindrical shape into which the power source connection 7 of the intermediate terminal 11 can be inserted, and the end of the wire connected to the source side is electrically connected to the other end of the source-side terminal 3.

After such source-side terminals 3 have been received in the inner housing 5, the wires are drawn from the exit portions 35, 37 of the inner housing 5, are bundled together, and are drawn out from the end of the grip 29 of the case 21. The source-side terminals 3 receive the respective power source connections 7 of the intermediate terminal 11 therein.

The intermediate terminal 11 includes a plurality, herein two, of intermediate source terminals 49 each capable of being electrically connected to and disconnected from the source terminal 45 of the source-side terminal 3 and a plurality, herein eight, of intermediate signal terminals 51 each capable of being electrically connected to and disconnected from the signal terminal 47 of the source-side terminal 3.

Each of a plurality of intermediate terminals 11 has the inlet connection 9 on one end thereof that can be electrically connected to and disconnected from the inlet-side terminal 93 connected to the side of the vehicle inlet 85 and the tab-shaped power source connection 7 on the other end thereof that can be removably inserted into the source-side terminal 3 and electrically connected to and disconnected from the source-side terminal 3.

The intermediate source terminal 49 of the intermediate terminal 11 has a cap 53 attached to the end of the inlet connection 9 and the inlet connection 9 is resiliently connected to the inlet-side terminal 93 through a spring 55 and a plate 57 when the charging connector 1 is mated with the vehicle inlet 85.

Here, the source terminal 45 of the source-side terminal 3 and the intermediate source terminal 49 of the intermediate terminal 11 constitute the pair of source terminals 17. The signal terminal 47 of the source-side terminal 3 and the intermediate signal terminal 51 of the intermediate terminal 11 constitute the pair of signal terminals 19.

Connection or disconnection lengths of the pair of source terminals 17 and the pair of signal terminals 19, that is, insertion or removal lengths of the power source connections 7 of the intermediate terminal 11 into or from the source-side terminal 3, are set differently for each of the pairs. Specifically, an insertion or removal length of the pair of source terminals 17 is set to be longer than that of the pair of signal terminals 19.

Such a setting allows the power source connection 7 of the intermediate terminal 11 of the pair of signal terminals 19 to be disengaged from the source-side terminal 3 before the pair of source terminals 17 if the cassette housing 13 should drop off the inner housing 5 during charging using the charging connector 1. Thus, power is deactivated and the occurrence of an arc can be prevented. Such an intermediate terminal 11 is received in the cassette housing 13.

The cassette housing 13 is formed in a cylindrical shape. The cassette housing 13 has a mating portion 59 mateable with the mating portion 33 of the inner housing 5 on one end, a receiving portion 61 for receiving the intermediate terminal 11 in the middle, and a connection 63 for the inlet connection 9 of the intermediate terminal 11 to be arranged on the other end.

The outer diameter of the mating portion 59 is determined to be slightly less than the inner diameter of the mating portion 33 of the inner housing 5, and the mating portion 59 is mateable within the mating portion 33 of the inner housing 5. The power source connection 7 of the intermediate terminal 11 is arranged in the mating portion 59. By mating the mating portion 59 of the cassette housing 13 with the mating portion 33 of the inner housing 5, the power source connection 7 is inserted into the source-side terminal 3, and the intermediate terminal 11 and the source-side terminal 3 are electrically connected to each other.

Note that the frequency of mating the inner housing 5 with and from the cassette housing 13, for example, in checking the cassette housing 13 and the inner housing 5, is very low compared to the frequency of mating the charging connector 1 with and from the vehicle inlet 85. As such, the frequency of inserting and removing the power source connection 7 of the intermediate terminal 11 into and from the source-side terminal 3 is very low so that the thickness of plating on the surface can be reduced, thereby reducing costs. The intermediate terminal 11 is received in the receiving portion 61 through the opening of the mating portion 59.

The receiving portion 61 defines a plurality of terminal receiving chambers, each capable of receiving the intermediate terminal 11, and the insides of the terminal receiving chambers are provided with engagement portions 65 and 67 for engaging and retaining the intermediate source terminal 49 and the intermediate signal terminal 51 of the intermediate terminal 11, respectively.

The receiving portion 61 has sealing members 69 and 71 arranged therein that seal between the cassette housing 13 and the intermediate source terminal 49 of the intermediate terminal 11 and between the cassette housing 13 and the intermediate signal terminal 51 of the intermediate terminal 11.

The outer peripheral side of the receiving portion 61 is provided with a plurality, herein two, of bolt holes 73 extending from a connection 63 to a mating portion 59 and being equally circumferentially spaced. The cassette housing 13 is secured to the inner housing 5 by inserting a bolt 77 into each of the bolt holes 73 through a collar 75 and tightening the bolt 77. The inlet connection 9 of the intermediate terminal 11 received in such a receiving portion 61 is arranged in the connection 63.

A plurality, herein four, of connections 63 extend cylindrically from the end face of the receiving portion 61 and are equally circumferentially spaced. The inlet connections 9 of the intermediate source terminals 49 are arranged in two symmetrically arranged respective connections 63 of the plurality of connections 63, while the inlet connections 9 of the intermediate signal terminals 51 are arranged in the other two respective connections 63.

The connection 63 is mated with the vehicle inlet 85 during charging using the charging connector 1, the inlet connections 9 of the intermediate terminal 11 are electrically connected to the respective inlet-side terminals 93, and power is then supplied to the vehicle power supply mounted on a vehicle.

In this manner, the intermediate terminal 11 having the inlet connection 9 to be connected to the inlet-side terminal 93 is provided with the power source connection 7 connected to the source-side terminal 3. Thus, if the inlet connection 9 is exhausted, the intermediate terminal 11 only needs to be replaced and it is not necessary to remove and replace a wire.

The intermediate terminal 11 is received in the cassette housing 13. Thus, when the intermediate terminal 11 is replaced, the cassette housing 13 only needs to be removed from the inner housing 5 and it is not necessary to involve removing the inner housing 5 from the case 21 and removing a wire from the inner housing 5.

This results in significantly reducing the burden of replacing, for example, the terminals and/or the housing in the conventional manner, and costs required for replacement can be greatly reduced. The connection 63 side of the cassette housing 13, which can be thus low-cost, is covered by the outer housing 15.

The outer housing 15 is formed in a cylindrical shape. The outer housing 15 is assembled to the cassette housing 13 so as to cover the outer peripheries of the connection 63 and the receiving portion 61 of the cassette housing 13. The outer peripheral side of the outer housing 15 is provided with a plurality, herein two, of bolt holes 79 extending from one end face to the other end face and being equally circumferentially spaced. The outer housing 15 is secured to the cassette housing 13 by inserting a bolt 83 into each of the bolt holes 79 through a collar 81 and tightening the bolt 83.

The outer peripheral side of the outer housing 15 is provided with two hole portions in addition to the bolt holes 79. These hole portions, which are closed by a bottom wall facing the end face of the cassette housing 13, close and protect the bolt holes 73 of the cassette housing 13 with the outer housing 15 assembled to the cassette housing 13.

Thus, by covering the outer periphery of the cassette housing 13 using the outer housing 15, damage of the cassette housing 13 caused by dropping the cassette housing 13 can be prevented. In addition, by closing the bolt holes 73 of the cassette housing 13, it is configured such that the cassette housing 13 cannot be easily removed from the inner housing 5.

The charging connector 1 includes the cassette housing 13 for receiving the intermediate terminal 11 having the power source connection 7 capable of being electrically connected to and disconnected from the source-side terminal 3 and the inlet connection 9 capable of being electrically connected to and disconnected from the inlet-side terminal 93. Thus, when the intermediate terminal 11 is replaced due to end-of-life of the inlet connection 9, the cassette housing 13 can be removed from the inner housing 5 and a new intermediate terminal 11 can be received in the cassette housing 13.

Accordingly, such a charging connector 1 does not require the process of removing the terminal from the wire and attaching a new terminal to the wire again, thereby greatly improving assembling workability.

The outer housing 15 for protecting the cassette housing 13 is assembled to the cassette housing 13 at its outer periphery of the side of the vehicle inlet 85. This prevents the cassette housing 13 from being damaged, for example, by dropping and improves the durability of the cassette housing 13.

Furthermore, the connection or disconnection length of the pair of source terminals 17 is set to be longer than that of the pair of signal terminals 19. Thus, if the cassette housing 13 should drop off the inner housing 5, the pair of signal terminals 19 is disengaged before the pair of source terminals 17 and power is deactivated, thereby preventing the occurrence of an arc.

Figure 15A:
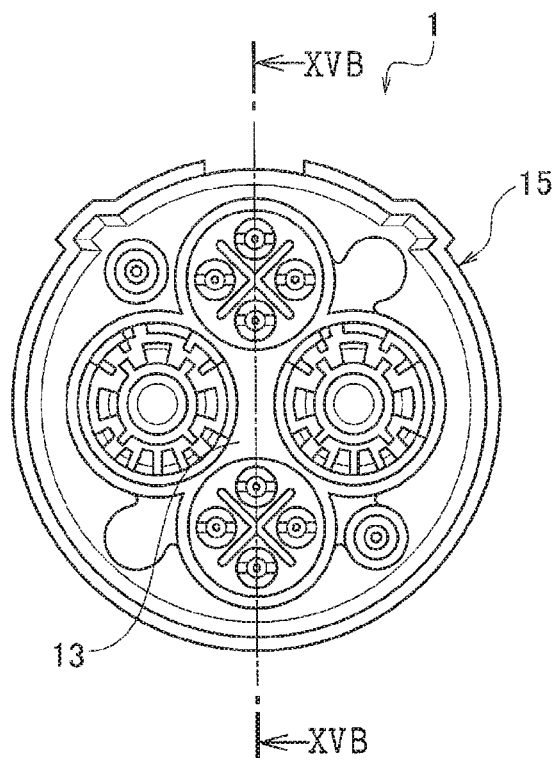
FIG. 15A is a front view of another example of the charging connector according to the embodiment of the present invention.
Figure 15B:
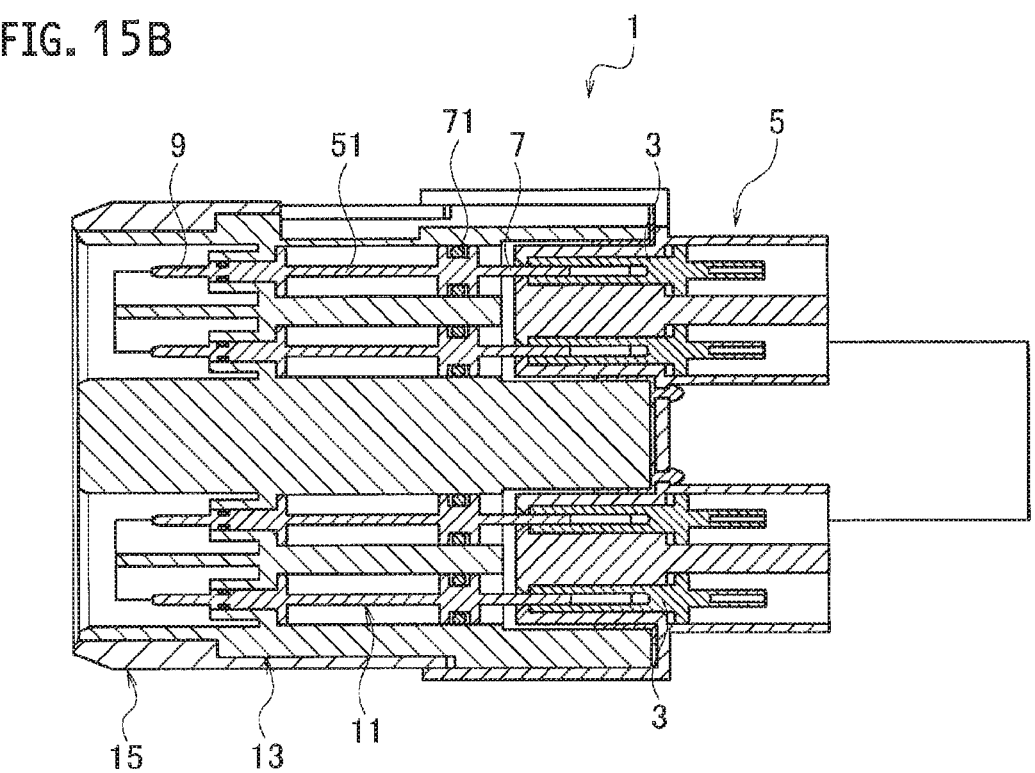
FIG. 15B is a sectional view taken along line XVB-XVB of FIG. 15A.

A sealing member 71 for sealing between the cassette housing 13 and the intermediate terminal 11 can be located on the inner housing 5 side as illustrated in FIG. 15B. In this case, when the sealing member 71 is inserted into the cassette housing 13, the sliding distance between the sealing member 71 and the cassette housing 13 is shortened so that resistance to insertion can be reduced and assembling workability can also be improved.

Note that the charging connector according to the embodiment of the present invention includes a male terminal serving as the intermediate terminal and a female terminal serving as the source-side terminal, but not limited thereto.

The intermediate terminal can be a female terminal and the source-side terminal can be a male terminal.

The case for receiving the inner housing is configured with two split separate members, but not limited thereto. The case may not be configured with separate members if the inner housing can be received therein.

Moreover, the cassette housing and the outer housing may be secured to the inner housing and the cassette housing, respectively, not only by using bolts but also by using engagement means for engaging with each other.

In this way, the present invention includes various embodiments not described above. Therefore, the scope of the present invention is determined only by the invention identification matters according to claims reasonable from the foregoing description.

What is claimed is:

1. A charging connector comprising:
   a source-side terminal connected to a source side;
   an inner housing for receiving the source-side terminal;
   an intermediate terminal having a power source connection electrically connectable to and electrically disconnectable from the source-side terminal and an inlet connection electrically connectable to and electrically disconnectable from an inlet-side terminal connected to a side of a vehicle inlet; and
   a cassette housing for receiving the intermediate terminal, the cassette housing being assembled to the inner housing and mateable with the vehicle inlet.

2. The charging connector according to claim 1, further comprising an outer housing assembled to an outer periphery of the cassette housing on the side of the vehicle inlet and configured to protect the cassette housing.

3. The charging connector according to claim 1, wherein the intermediate terminal and the source-side terminal comprise:
   a pair of source terminals electrically connectable to and electrically disconnectable from each other; and
   a pair of signal terminals electrically connectable to and electrically disconnectable from each other, and
   a length for connection and disconnection of the pair of source terminals is longer than a length for connection and disconnection of the pair of signal terminals.

4. The charging connector according to claim 2, wherein the intermediate terminal and the source-side terminal comprise:
   a pair of source terminals electrically connectable to and electrically disconnectable from each other; and
   a pair of signal terminals electrically connectable to and electrically disconnectable from each other, and
   a length for connection and disconnection of the pair of source terminals is longer than a length for connection and disconnection of the pair of signal terminals.

* * * * *